Patented Sept. 17, 1935

2,014,883

UNITED STATES PATENT OFFICE 2,014,883

METHANOL MANUFACTURE AND CATALYST THEREFOR

Barnett F. Dodge, New Haven, Conn., assignor to S. Karpen & Bros., Chicago, Ill., a corporation of West Virginia No Drawing. Application October 23, 1931, Serial No. 570,771

4 Claims. (Cl. 260—156)

This invention relates to the production of synthetic methanol by the reaction of hydrogen and oxides of carbon at elevated temperatures and pressures, and to an improved catalytic agent which is well suited to the purpose of aiding and expediting the reaction between hydrogen and oxides of carbon.

The primary object of this invention is to provide for the production of methanol at a rapid rate by means of a highly stabilized catalyst.

The use of contact bodies, serving as catalysts, is well known in the art of effecting reaction between carbon oxides and hydrogen to produce, for example, methanol; and many catalysts of this nature have been disclosed in patents and literature pertaining to the subject. As disclosed in my Patent No. 1,908,696, issued May 16, 1933, catalysts containing copper and zinc initially in the form of carbonates or hydroxides of the metals are particularly active. The improved catalyst herein described is likewise highly active. In addition, it is remarkably stable in use and thus possesses long life as a catalyst. In this respect, it possesses important advantages over the catalyst disclosed in said patent.

Such a catalyst shows a gradual decline in yield even when used at normal operating temperature, which apparently is due to a change in the physical structure of the catalyst, and not due to any poisoning either by foreign bodies contained in the gases or produced by chemical reaction. This decline is rendered more pronounced in case the catalyst is overheated.

The present invention is based upon the discovery that the addition of a chromium compound to such a copper-zinc catalyst tends to considerably retard the loss of activity and to stabilize it to the action of heat. Chromium may be added in various ways and in widely varying amounts. In order to facilitate the description of such compounds, the compositions of the catalysts are hereinafter expressed in atomic proportions of the metals. For example, a catalyst referred to as $Zn_{60}Cu_{30}Cr_{10}$ means one containing these metals in their proportion of sixty atoms of zinc, to thirty atoms of copper to ten atoms of chromium. Such formula, of course, does not indicate the non-metallic constituents of the catalyst which will vary in kind and proportion according to the treatment the catalyst has received, but has the advantage of expressing the metallic composition of the catalyst regardless of variations of the non-metallic constituents during the course of treatment.

The effect of the addition of chromium to a zinc-copper catalyst is to render it more stable under the action of heat and on the other hand in general tends to make it somewhat less active. A catalyst of the composition $Zn_{60}Cu_{30}Cr_{10}$ is, however, only slightly less active than a similar catalyst without the chromium, but is considerably more resistant to continued heating or overheating. On the other hand, a catalyst of the composition $Zn_{45}Cu_{10}Cr_{45}$ while considerably less active, is very resistant to the effect of elevated temperatures and in fact its activity is increased and only reaches a maximum after heating for a long period at a temperature of 100° to 200° C. above its optimum operating temperatures.

The chromium may be added in various ways. For example, it may be simultaneously precipitated with the zinc and copper from a solution containing all three metals, by various precipitating agents, such as alkalies or alkali carbonates; or a zinc-copper catalyst may be first made in the desired manner and chromium precipitated upon it as a carbonate, hydroxide or other suitable compound.

Such a zinc-copper catalyst may be prepared as follows: Five parts by weight of zinc and one part by weight of copper (or their chemical equivalents) are converted into nitrates and dissolved in sufficient water to produce a solution whose concentration is approximately 15 grams of the total metal per liter. This solution is then treated at room temperature or higher with a saturated solution of sodium carbonate to effect the simultaneous precipitation of the zinc and copper carbonates, intimately commingled. The precipitate is washed to remove nitrates, filtered, pressed in a hydraulic press, dried and broken up into granules of any desired size. To produce the final catalyst, preferably these granules are treated with hydrogen, carbon monoxide, or mixtures of them, at atmospheric pressure and at temperatures ranging from 100° C. to 450° C. Preferably, this treatment is carried out by heating at 150° for a time, and ultimately raising the temperature to 300° C. The time of treatment may extend over a period of several hours, a period of 8 to 12 hours having been found very satisfactory.

Where the catalyst is to contain chromium in relatively small proportion, a chromium-free catalyst may be prepared in any desired manner, as for example, by joint precipitation of carbonates or hydroxides, as set forth in my Patent No. 1,908,696, and then this chromium free precipitate may subsequently be treated with an appropriate amount of chromic acid, whereby some of the zinc and copper oxygen compounds are converted into chromates. The resulting precipitate is then treated with a reducing gas at an elevated temperature, during which treatment the chromates are presumably decomposed and the hexavalent chromium reduced to trivalent chromium. The treatment with chromic acid may be carried out in various ways, but the preferred method is to stop the preparation of the zinc-copper catalyst at the point where a thick slurry of mixed precipitates and water is formed to which a solution of chromic acid is added and the resulting mixture thereupon evaporated to dryness with frequent agitation.

Where it is desired to prepare a catalyst containing chromium in percentages of more than twenty atomic percent, the preferred method is to prepare a solution containing the ions of zinc, copper and trivalent chromium and precipitate the three metals simultaneously as hydroxides, carbonates, or other salts, which upon heating easily decompose to give the oxides. This method may, of course, also be used where the percentage of chromium is to be small.

It is preferred to effect precipitation in either method of preparation from a solution of the mixed nitrates, but it is possible to use other soluble salts of the metals. It is important, however, to avoid the presence of impurities or contaminating substances which may have a deleterious effect. Thus, it is desirable to avoid the presence of sulphur (free or combined), the halides, etc. The improved catalysts described are halide-free.

As set forth in my co-pending application 421,263, subsequently issued as Patent 1,908,696, the zinc oxide possesses as a result of the treatment, a physical structure which is well adapted to the purpose of the catalyst. The particles of copper, as a result of the treatment, possess a deep purple, or dark reddish purple color, which apparently is characteristic of a very active condition of the copper for catalysis purposes. Copper produced by the method described does not deteriorate if exposed to air.

A catalyst produced as described above is so active that it will produce methanol in appreciable quantities at temperatures as low as 200° C. with pressure of 2600 pounds per sq. in., using a gas mixture containing approximately two parts of hydrogen to one part of carbon monoxide by volume.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The method of producing methanol, which comprises passing a mixture of hydrogen and a carbon oxide, at a pressure substantially above atmospheric pressure and a temperature substantially above 200° C., over a catalyst comprising essentially an intimate mixture of zinc and chromium oxides and finely divided free copper, the molecular ratio of zinc to copper being of the order of 2 to 4½ atoms of zinc to one atom of copper.

2. A methanol catalyst comprising essentially intimately mixed finely divided free copper and oxygen compounds of zinc and chromium, the molecular ratio of zinc to copper being of the order of 2 to 4½ atoms of zinc to one atom of copper.

3. A methanol catalyst comprising essentially intimately mixed finely divided free copper, the extent of the division of the copper being such as to produce a purplish color, and oxygen compounds of zinc and chromium, and the ratio of zinc to copper being of the order of 2 to 4½ atoms of zinc to one atom of copper.

4. The method of stabilizing a heat unstable methanol catalyst comprising essentially zinc oxide and finely divided free copper in a ratio of the order of 2 to 4½ atoms of zinc to one atom of copper, which comprises intimately mixing therewith a chromium oxygen compound.

BARNETT F. DODGE.